US012198843B2

(12) United States Patent
Furukawa et al.

(10) Patent No.: US 12,198,843 B2
(45) Date of Patent: Jan. 14, 2025

(54) INDUCTOR

(71) Applicant: NITTO DENKO CORPORATION, Osaka (JP)

(72) Inventors: Yoshihiro Furukawa, Osaka (JP); Keisuke Okumura, Osaka (JP)

(73) Assignee: NITTO DENKO CORPORATION, Osaka (JP)

(*) Notice: Subject to any disclaimer, the term of this patent is extended or adjusted under 35 U.S.C. 154(b) by 587 days.

(21) Appl. No.: 17/437,682

(22) PCT Filed: Feb. 5, 2020

(86) PCT No.: PCT/JP2020/004233
§ 371 (c)(1),
(2) Date: Sep. 9, 2021

(87) PCT Pub. No.: WO2020/183994
PCT Pub. Date: Sep. 17, 2020

(65) Prior Publication Data

US 2022/0165473 A1 May 26, 2022

(30) Foreign Application Priority Data

Mar. 12, 2019 (JP) ................................ 2019-044771

(51) Int. Cl.
*H01F 27/245* (2006.01)
*H01F 1/37* (2006.01)
(Continued)

(52) U.S. Cl.
CPC ............ *H01F 27/255* (2013.01); *H01F 1/37* (2013.01); *H01F 27/245* (2013.01); *H01F 27/2823* (2013.01)

(58) Field of Classification Search
CPC .. H01F 27/255; H01F 27/2823; H01F 27/245; H01F 17/0013; H01F 2027/2809;
(Continued)

(56) References Cited

U.S. PATENT DOCUMENTS

| | | | |
|---|---|---|---|
| 6,392,525 B1 | 5/2002 | Kato et al. |
| 11,508,507 B2 | 11/2022 | Okumura et al. |

(Continued)

FOREIGN PATENT DOCUMENTS

| | | |
|---|---|---|
| CN | 105225802 A | 1/2016 |
| CN | 105575621 A | 5/2016 |

(Continued)

OTHER PUBLICATIONS

Decision of Refusal, issued by the Japanese Patent Office on May 16, 2023, in connection with Japanese Patent Application No. 2019-044778.

(Continued)

*Primary Examiner* — Tszfung J Chan
(74) *Attorney, Agent, or Firm* — Edwards Neils LLC; Jean C. Edwards, Esq.

(57) ABSTRACT

An inductor includes a wire, and a magnetic layer covering the wire. The wire includes a conducting line, and an insulating layer. The magnetic layer contains an anisotropic magnetic particle and a binder. In a peripheral region of the wire, the magnetic layer includes an orientated region in which the anisotropic magnetic particle is orientated along the periphery of the wire. The peripheral region is, in a cross-sectional view, a region from an outer surface of the wire to an outward distance of 1.5 times an average of the longest length and the shortest length from the center of gravity of the wire to the outer surface of the wire. An upper surface and a lower surface of the inductor are flat.

4 Claims, 9 Drawing Sheets

(51) Int. Cl.
*H01F 27/255* (2006.01)
*H01F 27/28* (2006.01)

(58) Field of Classification Search
CPC .. H01F 17/0006; H01F 27/2804; H01F 5/003; H01F 27/29; H01F 27/292; H01F 17/04
USPC .................................................. 336/200, 232
See application file for complete search history.

(56) References Cited

U.S. PATENT DOCUMENTS

| | | | | |
|---|---|---|---|---|
| 2004/0246084 | A1* | 12/2004 | Matsutani | H01F 27/327 336/5 |
| 2006/0152321 | A1 | 7/2006 | Jung et al. | |
| 2007/0247268 | A1 | 10/2007 | Oya et al. | |
| 2008/0164844 | A1 | 7/2008 | Kato et al. | |
| 2009/0002117 | A1 | 1/2009 | Kawarai | |
| 2009/0243780 | A1 | 10/2009 | Inoue et al. | |
| 2013/0168149 | A1 | 7/2013 | Gundel | |
| 2013/0228717 | A1 | 9/2013 | Harada et al. | |
| 2014/0167897 | A1 | 6/2014 | Choi et al. | |
| 2015/0371752 | A1 | 12/2015 | Park et al. | |
| 2016/0086727 | A1 | 3/2016 | Choi et al. | |
| 2016/0126006 | A1 | 5/2016 | Ahn et al. | |
| 2016/0172086 | A1 | 6/2016 | Habu et al. | |
| 2016/0247612 | A1 | 8/2016 | Ebe et al. | |
| 2016/0343498 | A1 | 11/2016 | Lee et al. | |
| 2017/0004915 | A1* | 1/2017 | Park | H01F 27/255 |
| 2017/0148561 | A1* | 5/2017 | Yoon | H05K 1/181 |
| 2018/0166194 | A1 | 6/2018 | Choi | |
| 2018/0268983 | A1 | 9/2018 | Kwon et al. | |
| 2018/0286555 | A1 | 10/2018 | Aoki et al. | |
| 2018/0286569 | A1 | 10/2018 | Ahn et al. | |
| 2019/0013148 | A1 | 1/2019 | Ohkubo et al. | |
| 2019/0096566 | A1 | 3/2019 | Oahara et al. | |
| 2019/0180909 | A1 | 6/2019 | Shinohara et al. | |
| 2019/0189340 | A1 | 6/2019 | Kim et al. | |
| 2019/0244743 | A1 | 8/2019 | Hirai et al. | |
| 2020/0075238 | A1 | 3/2020 | Okumura et al. | |
| 2020/0168375 | A1 | 5/2020 | Park et al. | |
| 2020/0258666 | A1 | 8/2020 | Kou et al. | |
| 2022/0384091 | A1 | 12/2022 | Yoshioka et al. | |

FOREIGN PATENT DOCUMENTS

| | | | | | |
|---|---|---|---|---|---|
| CN | 105895307 | A | | 8/2016 | |
| EP | 2 963 094 | A1 | | 1/2016 | |
| JP | S48-088475 | U | | 10/1973 | |
| JP | H05-152130 | A | | 6/1993 | |
| JP | 10-074626 | A | | 3/1998 | |
| JP | H10-144526 | A | | 5/1998 | |
| JP | H11-040979 | A | | 2/1999 | |
| JP | 2001-185421 | A | | 7/2001 | |
| JP | 2003-282333 | A | | 10/2003 | |
| JP | 2007116347 | A | * | 5/2007 | |
| JP | 2008-098406 | A | | 4/2008 | |
| JP | 2008-172873 | A | | 7/2008 | |
| JP | 2009-009985 | A | | 1/2009 | |
| JP | 2013-543635 | A | | 12/2013 | |
| JP | 2014-165363 | A | | 9/2014 | |
| JP | 2014183193 | A | * | 9/2014 | H01F 27/022 |
| JP | 2015-092544 | A | | 5/2015 | |
| JP | 2016-092422 | A | | 5/2016 | |
| JP | 2017-005115 | A | | 1/2017 | |
| JP | 2017-017314 | A | | 1/2017 | |
| JP | 2017-037888 | A | | 2/2017 | |
| JP | 2018032841 | A | | 3/2018 | |
| JP | 2018-092092 | A | | 6/2018 | |
| JP | 2018-098494 | A | | 6/2018 | |
| JP | 2019-220618 | A | | 12/2019 | |
| KR | 20160099882 | A | | 8/2016 | |
| KR | 10-2017-0085889 | A | | 7/2017 | |
| TW | 201513142 | A | | 4/2015 | |
| TW | 201707019 | A | | 2/2017 | |
| TW | 201826295 | A | | 7/2018 | |
| WO | 2014/132701 | A1 | | 9/2014 | |
| WO | WO-2016199638 | A1 | * | 12/2016 | |
| WO | 2019/244620 | | | 12/2019 | |

OTHER PUBLICATIONS

Notification of Reasons to Refusal, issued by the Japanese Patent Office on Feb. 28, 2023, in connection with Japanese Patent Application No. 2019-044773.
Office Action, issued by the Japanese Patent Office on Dec. 20, 2022, in connection with Japanese Patent Application No. 2019-044771.
Office Action, issued by the Japanese Patent Office on Dec. 20, 2022, in connection with Japanese Patent Application No. 2019-044768.
Decision of Refusal, issued by the Japanese Patent Office on Mar. 7, 2023, in connection with Japanese Patent Application No. 2019-044771.
International Preliminary Report on Patentability issued by WIPO on Aug. 25, 2021, in connection with International Patent Application No. PCT/JP2020/004233.
International Preliminary Report on Patentability issued by WIPO on Aug. 25, 2021, in connection with International Patent Application No. PCT/JP2020/004232.
International Preliminary Report on Patentability issued by WIPO on Aug. 25, 2021, in connection with International Patent Application No. PCT/JP2020/004225.
International Preliminary Report on Patentability issued by WIPO on Aug. 25, 2021, in connection with International Patent Application No. PCT/JP2020/004238.
International Preliminary Report on Patentability issued by WIPO on Aug. 25, 2021, in connection with International Patent Application No. PCT/JP2020/004228.
International Preliminary Report on Patentability issued by WIPO on Aug. 25, 2021, in connection with International Patent Application No. PCT/JP2020/004223.
International Preliminary Report on Patentability issued by WIPO on Aug. 25, 2021, in connection with International Patent Application No. PCT/JP2020/004234.
International Preliminary Report on Patentability issued by WIPO on Aug. 25, 2021, in connection with International Patent Application No. PCT/JP2020/004236.
Non-Final Office Action issued in U.S. Appl. No. 17/437,673 on Mar. 27, 2024.
Office Action, issued by the Japanese Patent Office on Jan. 31, 2023, in connection with Japanese Patent Application No. 2019-044778.
International Search Report Issued in PCT/JP2020/004232 on Apr. 21, 2020.
Written Opinion Issued in PCT/JP2020/004232 on Apr. 21, 2020.
International Search Report Issued in PCT/JP2020/004225 on Apr. 14, 2020.
Written Opinion Issued in PCT/JP2020/004225 on Apr. 14, 2020.
International Search Report Issued in PCT/JP2020/004238 on Apr. 28, 2020.
Written Opinion Issued in PCT/JP2020/004238 on Apr. 28, 2020.
International Search Report Issued in PCT/JP2020/004228 on Apr. 28, 2020.
Written Opinion Issued in PCT/JP2020/004228 on Apr. 28, 2020.
International Search Report Issued in PCT/JP2020/004233 on Apr. 28, 2020.
Written Opinion Issued in PCT/JP2020/004233 on Apr. 28, 2020.
Notification of Reasons to Refusal, issued by the Japanese Patent Office on Mar. 7, 2023, in connection with Japanese Patent Application No. 2019-044768.
Office Action, issued by the Japanese Patent Office on Jan. 10, 2023, in connection with Japanese Patent Application No. 2019-044779.
Office Action, issued by the Korean Intellectual Property Office on Jun. 7, 2024, in connection with Korean Patent Application No. 10-2021-7028621.
Office Action, issued by the Korean Intellectual Property Office on Jun. 11, 2024, in connection with Korean Patent Application No. 10-2021-7028618.

(56) References Cited

OTHER PUBLICATIONS

Office Action, issued by the Korean Intellectual Property Office on Jun. 7, 2024, in connection with Korean Patent Application No. 10-2021-7028625.
Office Action, issued by the Korean Intellectual Property Office on Jun. 7, 2024, in connection with Korean Patent Application No. 10-2021-7028626.
Office Action, issued by the Taiwanese Patent Office on Mar. 21, 2024, in connection with Taiwanese Patent Application No. 109104915.
Office Action, issued by the Taiwanese Patent Office on Mar. 21, 2024, in connection with Taiwanese Patent Application No. 109104980.
Non-Final Office Action issued in U.S. Appl. No. 17/437,680 on May 29, 2024.
Non-Final Office Action issued in U.S. Appl. No. 17/437,663 on May 21, 2024.
Office Action, issued by the Taiwanese Patent Office on Mar. 7, 2024, in connection with Taiwanese Patent Application No. 109104912.
Office Action, issued by the Taiwanese Patent Office on Mar. 7, 2024, in connection with Taiwanese Patent Application No. 109104913.
Non-Final Office Action issued in U.S. Appl. No. 17/437,671 on May 7, 2024.

* cited by examiner

INDUCTOR

CROSS-REFERENCE TO RELATED APPLICATIONS

The present application is a 35 U.S.C. 371 National Stage Entry PCT/JP2020/004233, filed on Feb. 5, 2020, which claims priority from Japanese Patent Application No. 2019-044771, filed on Mar. 12, 2019, the contents of all of which are herein incorporated by reference in their entirety.

TECHNICAL FIELD

The present invention relates to an inductor.

BACKGROUND ART

It has been known that an inductor is incorporated in an electronic device and the like to be used as a passive element for a voltage conversion member and the like.

For example, an inductor including a rectangular parallelepiped chip body portion made of magnetic material and an inner conductor such as copper embedded. in the chip body portion, and having a cross-sectional shape of the chip body portion similar to that of the inner conductor has been proposed (ref: Patent Document 1). That is, in the inductor of Patent Document 1 the magnetic material is coated around a wire (inner conductor) in a rectangular shape (rectangular parallelepiped shape) in a cross-sectional view.

CITATION LIST

Patent Document

Patent Document 1: Japanese Unexamined Patent Publication. No. H10444526

SUMMARY OF THE INVENTION

Problem to be Solved by the Invention

It has been considered that the inductance of the inductor is improved by using anisotropic magnetic particles, such as flat-shaped magnetic particles, as the magnetic material oriented around the wire.

However, in the inductor of Patent Document 1, since the wire has a rectangular shape in a cross-sectional view, a problem of hardly orientating the anisotropic magnetic particles around the wire occurs by the presence of comers and the like. Therefore, there is a case where the improvement of the inductance becomes insufficient.

Therefore, it is further considered that a circular wire in a cross-sectional view is used and the anisotropic magnetic particles are orientated around the wire.

However, when the anisotropic magnetic particles are orientated around the wire, as referred to FIG. 12, unevenness caused by the wire occurs on the upper surface of the inductor. Such an inductor then results in poor mountability. That is, though it is necessary to convey the inductor with a suction conveyance device such as a collet to be disposed on a desired wiring board, a problem of not being sucked into the collet even when attempting to suck the inductor occurs due to the influence of the unevenness on the inductor surface. In addition, when the inductor is disposed on the wiring board, the inductor also needs to be disposed without tilting.

The present invention provides an inductor capable of achieving both excellent inductance and mountability.

Means for Solving the Problem

The present invention [1] includes an inductor including a wire, and a magnetic layer covering the wire, wherein the wire includes a conducting line, and an insulating layer covering the conducting line, the magnetic layer contains an anisotropic magnetic particle, and a binder; in a peripheral region of the wire, the magnetic layer includes an orientated region in which the anisotropic magnetic particle is orientated along a periphery of the wire; the peripheral region is, in a cross-sectional view, a region from an outer surface of the wire to air outward distance of 1.5 times an average of the longest length and the shortest length from the center of gravity of the wire to the outer surface of the wire; and one surface in a thickness direction and the other surface in the thickness direction of the inductor are flat.

According to the inductor, since in the periphery of the wire, the orientated region in which the anisotropic magnetic particles are orientated along the periphery of the wire is present, the inductance is excellent.

Further, since one surface in the thickness direction of the inductor is flat, it is possible to reliably suck one surface in the thickness direction with a conveyance device such as a collet, and reliably convey the inductor. Further, since the other surface in the thickness direction of the inductor is flat, it is possible to dispose the other surface in the thickness direction on a mounting object without tilting. Therefore, the mountability is excellent.

The present invention [2] includes the inductor described in [1], wherein the plurality of wires are disposed spaced apart from each other in a direction perpendicular to the thickness direction, and the plurality of wires are continuous through the magnetic layer.

According to the inductor, since the magnetic layer continuous in the direction perpendicular to the thickness direction is disposed between the plurality of wires, the inductance is excellent.

The present invention [3] includes the inductor described in [1] or [2], wherein at least one of one surface in the thickness direction and the other surface in the thickness direction of the inductor consists of the magnetic layer.

According to the inductor, since at least one of one surface in the thickness direction and the other surface in the thickness direction of the inductor is the magnetic layer, the inductance is excellent.

The present invention [4] includes the inductor described in [3], wherein the magnetic layer is continuous from one surface in the thickness direction to the other surface in the thickness direction of the inductor, and both one surface in the thickness direction and the other surface in the thickness direction of the inductor consist of the magnetic layer.

According to the inductor, since both one surface in the thickness direction and the other surface in the thickness direction of the inductor are the magnetic layer, the inductor ts filled with the magnetic layer except for the region of the wire. Therefore, the inductance is further more excellent.

Effect of the Invention

According to the inductor of the present invention, it is possible to achieve both excellent inductance and mountability.

BRIEF DESCRIPTION OF THE DRAWINGS

FIG. 1A illustrating a plan view and

FIG. 1B illustrating an A-A cross-sectional view of FIG. A.

FIG. 4A illustrating a disposing step and

FIG. 4B illustrating a lamination step.

FIG. 6A illustrating a singulation step,

FIG. 6B illustrating a conveyance step, and

FIG. 6C illustrating a disposing step.

DESCRIPTION OF EMBODIMENTS

In FIG. 1 A, the right-left direction on the plane of the sheet is a first direction, the left side on the plane of the sheet is one side in the first direction, and the right side on the plane of the sheet is the other side in the first direction. The up-down direction on the plane of the sheet is a second direction (direction perpendicular to the first direction), the upper side on the plane of the sheet is one side in the second direction (one direction of a wire axis), and the lower side on the plane of the sheet is the other side in the second direction (the other direction of the wire axis). The paper thickness direction on the plane of the sheet is an up-down direction (third direction perpendicular to the first direction and the second direction, thickness direction), the near side on the plane of the sheet is an upper side (one side in the third direction, one side in the thickness direction), and the far side on the plane of the sheet is a lower side (the other side in the third direction, the other side in the thickness direction). Specifically, directions are in conformity with direction arrows of each view.

First Embodiment

1. Inductor

One embodiment of a first embodiment of an inductor of the present invention is described with reference to FIGS. 1A to 2.

Figure 1A:
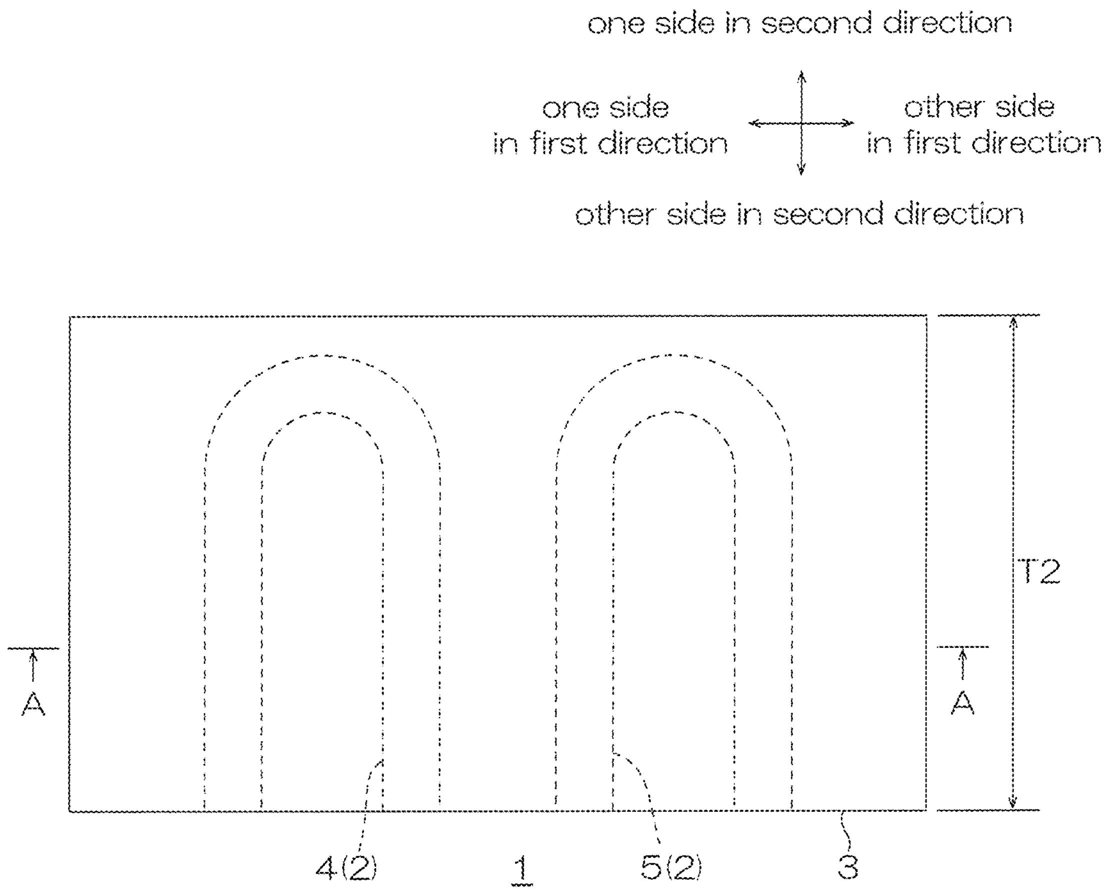
FIGS. 1A to 1B show a first embodiment of an inductor of the present invention.
Figure 1B:
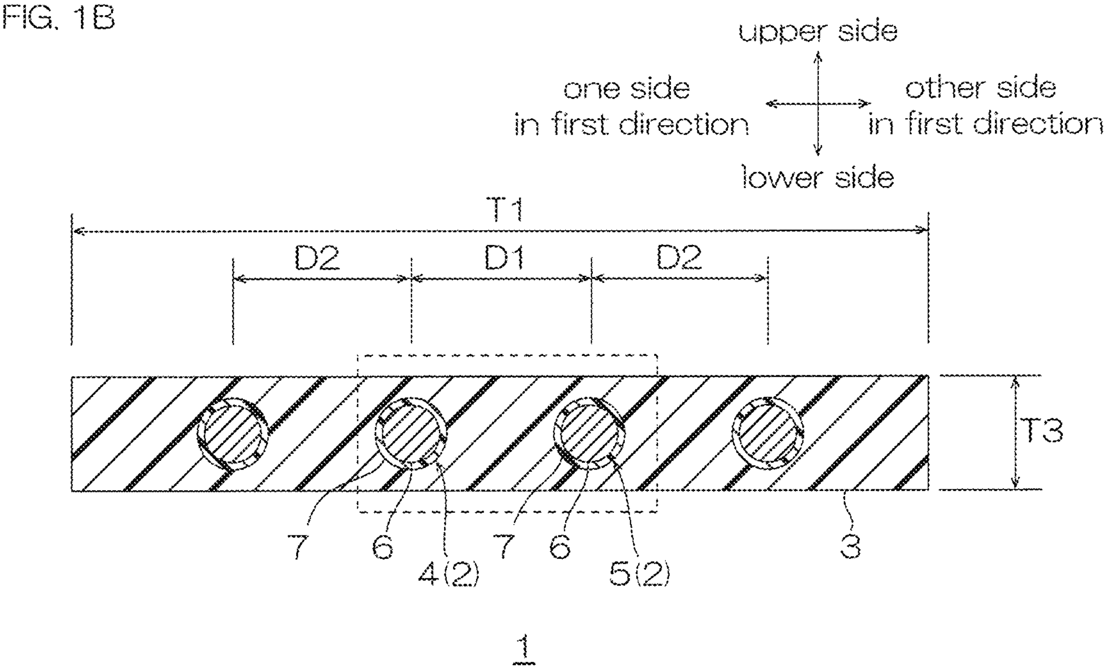

As shown in FIGS. 1A to 1B, an inductor 1 has a generally rectangular shape when viewed from the top extending in a plane direction (the first direction and the second direction). The inductor 1 includes a plurality of (two) wires 2, and a magnetic layer 3.

Each of the plurality of wires 2 includes a first wire 4, and a second wire 5 disposed spaced apart from the first wire 4 in a width direction (the first direction; direction perpendicular to the thickness direction).

As shown in FIGS 1A to 1B. the first wired extends long in the second direction, and has, for example, a generally U-shape when viewed from the top. The first wire 4 has a generally circular shape in a cross-sectional view.

The first wire 4 includes a conducting line 6, and an insulating layer 7 covering it.

The conducting line 6 extends long in the second direction, and has, for example, a generally U-shape when viewed from the top. Further, the conducting line 6 has a generally circular shape in a cross-sectional view sharing a central axis with the first wire 4.

Examples of a material for the conducting line 6 include metal conductors such as copper, silver, gold, aluminum, nickel, and an alloy of these, and preferably, copper is used. The conducting line 6 may have a single-layer structure, or a multi-layer structure in which plating (for example, nickel) is applied to the surface of a ewe conductor (for example, copper).

A radius R1 of the conducting line 6 is, for example, 25 μm or more, preferably 50 μm or more, and for example, 2000 μm or less, preferably 200 μm or less.

The insulating layer 7 is a layer for protecting the conducting line 6 from chemicals and water, and also preventing a short circuit of the conducting line 6. The insulating layer 7 is disposed so as to cover the entire outer peripheral surface of the conducting line 6.

The insulating layer 7 has a generally circular ring shape in a cross-sectional view sharing a central axis (center C1) with the first wire 4.

Examples of a material for the insulating layer 7 include insulating resins such as polyvinyl formal, poly ester, polyesterimide, polyamide (including nylon), polyimide, polyamideimide, and polyurethane. These may be used alone or in combination of two or more.

The insulating layer 7 may consist of a single layer or a plurality of layers.

A thickness R2 of the insulating layer 7 is generally uniform in a radial direction of the wire 2 at any position in a circumferential direction, and is, for example, 1 μm or more, preferably 3 μm or more, and for example, 100 μm or less, preferably 50 μm or less.

A ratio (R1/R2) of the radius R1 of the conducting line 6 to the thickness R2 of the insulating layer 7 is, for example, 1 or more, preferably 10 or more, and for example, 200 or less. preferably 100 or less.

A radius (R1+R2) of the first wire 4 is, for example, 25 μm or more, preferably 50 μm or more, and for example, 2000 μm or less, preferably 200 μm or less.

When the first wire 4 has a generally U-shape, a center-to-center distance D2 of the first wire 4 is the same distance as a center-to-center distance D1 between the plurality of wires 2 to he described later, and is, for example, 20 μm or more, preferably 50 μm or more, and for example, 3000 μm or less, preferably 2000 μpm or less.

The second wire 5 has the same shape, configuration, dimension, and material as the first wire 4. That is, the second wire 5 includes, like the first wire 4, the conducting line 6, and the insulating layer 7 covering it.

The plurality of wires 2 (the first wire 4 and the second wire 5) are continuous through the magnetic layer 3 to be described later. That is, the magnetic layer 3 extending in the first direction is disposed between the first wire 4 and the second wire 5, and the magnetic layer 3 is in contact with both the first wire 4 and the second wire 5.

The center-to-center distance D1 between the first wire 4 and the second wire 5 is, for example, 20 μm or more, preferably 50 μm or more, and for example, 3000 μm or less, preferably 2000 μm or less.

The magnetic layer 3 is a layer for improving the inductance.

The magnetic layer 3 is disposed so as to cover the entire outer peripheral surfaces of the plurality of wires 2. The magnetic layer 3 forms the outer shape of the inductor 1. Specifically, the magnetic layer 3 has a generally rectangular shape when viewed from the top extending in the plane direction (the first direction and the second direction). Further, at the other surface of the magnetic layer 3 in the second direction, end edges in the second direction of the plurality of wires 2 are exposed.

The magnetic layer 3 is formed from a magnetic composition containing anisotropic magnetic particles 8 and a binder 9.

Examples of a material for constituting the anisotropic magnetic particles (hereinafter, also abbreviated as "particles") 8 include a soft magnetic material and a hard magnetic material. Preferably, from the viewpoint of inductance, a soft magnetic material is used.

Examples of a soft magnetic material include a single metal material containing one kind of metal element in a state of a pure material, and an alloy material which is a eutectic (mixture) of one or more kinds of metal element (first metal element) with one or more kinds of metal element (second metal element) and for non-metal element (carbon, nitrogen, silicon, phosphorus, and the like). These may be used alone or in combination.

An example of the single metal material includes a simple substance of metal consisting of only one kind of metal element (first metal element). The first metal element is, for example, appropriately selected from metal elements that can be included as the first metal element of the soft magnetic material such as iron (Fe), cobalt (Co), nickel (Ni). and the like.

Further, examples of the single metal material include a form including a core consisting of only one kind of metal element and a surface layer including an inorganic material and/or an organic material which modify/modifies a portion of or the entire surface of the core, and an other form generated by decomposition (thermal decomposition or the like) of an organic metal compound or inorganic metal compound which includes the first metal element. More specifically, an example of the latter form includes an iron powder (may be referred to as a carbonyl iron powder) generated by thermal decomposition of an organic iron compound (specifically, carbonyl iron) including iron as the first metal element. The position of a layer including the inorganic material and-or the organic material modifying a portion including only one kind of metal element is not limited to the above-described surface. The organic metal compound and the inorganic metal compound from which the single metal material can be obtained are not particularly limited, and can be appropriately selected from a known or conventional organic metal compound and inorganic metal compound that can generate the single metal material of the soft magnetic material.

The alloy material is not particularly limited as long as it is a eutectic of one or more kinds of metal element (first metal element) with one or more kinds of metal element (second metal element) and/or non-metal element (carbon, nitrogen, silicon, phosphorus, and the like), and can be used as an alloy material of a soft magnetic material.

The first metal element is an essential element in the alloy material, and examples thereof include iron (Fe), cobalt (Co), and nickel (Ni). When the first metal element is Fe, the alloy material is referred to as an Fe-based alloy, when the first metal element is Co, the alloy material is referred to as a Co-based alloy: and when the first metal element is Ni, the alloy material is referred to as a Ni-based alloy.

The second metal element is an element (sub-component) which is secondarily contained in the alloy material, and is a metal element to be mutually soluble with (eutectic to) the first metal element. Examples thereof include iron (Fe) (when the first metal element is other than Fe), cobalt (Co) (when the first metal element is other than Co), nickel (Ni) (when the first metal element is other than Ni), chromium (Cr), aluminum (Al), silicon (Si), copper (Cu), silver (Ag), manganese (Mn), calcium (Ca), barium (Ba), titanium (Ti), zirconium (Zr), hafnium (Hf), vanadium (V), niobium (Nb), tantalum (Ta), molybdenum (Mo), tungsten (W), ruthenium (Ru), rhodium (Rh), zinc (Zn), gallium (Ga), indium (In), germanium (Ge), tin (Sn), lead (Pb), scandium (Sc), yttrium (Y), strontium (Sr), and various rare earth elements. These may be used alone or in combination of two or more.

The non-metal element is an element (sub-component) which is secondarily contained in the alloy material and is a non-metal element which is mutually soluble with (eutectic to) the first metal element. Examples thereof include boron (B), carbon (C), nitrogen (N), silicon (Si), phosphorus (P), and sulfur (S). These may be used alone or in combination of two or more.

Examples of the Fe-based alloy which is one example of an alloy material include magnetic stainless steel (Fe—Cr—-Al—Si alloy), including electromagnetic stainless steel, Sendust (Fe—Si—Al alloy), including Super sendust, permalloy (Fe—Ni alloy). Fe—Ni—Mo alloy, Fe—Ni—Mo—Cu alloy, Fe—Ni—Co alloy, Fe—Cr alloy, Fe—Cr—Al alloy, Fe—Ni—Cr alloy, Fe—Ni—Cr—Si alloy, silicon copper (Fe—Cu—Si alloy), Fe—Si alloy, Fe—Si—B (—Cu—Nb) alloy, Fe—B—Si—Cr alloy, Fe—Si—Cr—Ni alloy, Fe—Si—Cr alloy. Fe—Si—Al—Ni—Cr alloy, Fe—Ni—Si—Co alloy, Fe—N alloy, Fe—C alloy, Fe—B alloy, Fe—P alloy, ferrite (including stainless steel ferrite and further. soft ferrite such as Mn—Mg ferrite. Mn—Zn ferrite, Ni—Zn ferrite. Ni—Zn—Cu ferrite, Ou—Zn ferrite, and Cu—Mg—Zn ferrite), Permendur (Fe—Co alloy), Fe—Co—V alloy, and Fe-based amorphous alloy Examples of the Co-based alloy which is one example of an alloy material include Co—Ta—Zr and a cobalt (Co)-based amorphous alloy An example of the Ni-based alloy which is one example of an alloy material includes a Ni—Cr alloy.

Of the soft magnetic bodies, from the viewpoint of magnetic properties, preferably, an alloy material is used, more preferably, a Fe-based alloy is used, further more preferably. Sendust (Fe—Si—Al alloy) is used. Further, as the soft magnetic material, preferably, a single metal material is used, more preferably, a single metal material containing an iron element in a state of a pure material is used, further more preferably, iron alone or an iron powder (carbonyl iron powder) is used.

Examples of a shape of the particles 8 include a flat shape (plate shape) and a needle shape from the viewpoint of anisotropy, and preferably, a flat shape is used from the viewpoint of excellent relative magnetic permeability in the plane direction (two dimension). The magnetic layer 3 may also further contain non-anisotropic magnetic particles in addition to the anisotropic magnetic particles 8. The non-anisotropic magnetic particles may have, for example, a shape such as spherical, granular, massive, or pelletized. An average particle size of the non-anisotropic magnetic particles is, for example, 0.1 μm or more, preferably 0.5 m or more, and for example, 200 μm or less, preferably 150 μm or less.

A flat ratio (flatness) of the flat-shaped particles 8 is, for example, 8 or more, preferably 15 or more, and for example, 500 or less, preferably 450 or less. The flat ratio is, for example, calculated as an aspect ratio obtained by dividing an average particle size (average length) (described later) of the particles 8 by an average thickness of the particles 8.

The average particle size (average length) of the particles 8 (anisotropic magnetic particles) is, for example, 3.5 μm or more, preferably 10 μm or more, and for example, 200 μm or less, preferably 150 μm or less. When the particles 8 are flat-shaped, the average thickness thereof is, for example, 0.1 μm or more, preferably 0.2 μm or more, and for example, 3.0 μm or less, preferably 2.5 μm or less.

Examples of the binder 9 include a thermosetting resin and a thermoplastic resin.

Examples of the thermosetting resin include epoxy resins, phenol resins, melamine resins, thermosetting polyimide resins, unsaturated polyester resins, polyurethane resins, and silicone resins. From the viewpoint of adhesive properties, heat resistance, and the like, preferably, an epoxy resin and a phenol resin are used.

Examples of the thermoplastic resin include acrylic resins, ethylene-vinyl acetate copolymers, polycarbonate resins, polyamide resins (6-nylon, 6,6-nylon, and the like), thermoplastic polyimide resins, and saturated polyester resins (PET, PBT, and the like). Preferably, an acrylic resin is used.

Preferably, a combination of a thermosetting resin and a thermoplastic resin is used as the binder 9. More preferably, a combination of an acrylic resin, an epoxy resin, and a phenol resin is used. Thus, the particles 8 in a predetermined orientated state at a high filling rate can be further more reliably fixed to the periphery of the wire 2.

Further, if necessary, the magnetic composition may also contain additives such as a thermosetting catalyst, inorganic particles, organic particles, and a cross-linking agent.

In the magnetic layer 3, the particles 8 are uniformly disposed, while being orientated in the binder 9. The magnetic layer 3 is continuous from the upper surface (one surface in the thickness direction) to the lower surface (the other surface in the thickness direction) of the inductor 1. The magnetic layer 3 includes the wires 2 when projected in the plane direction. That ts, the upper surface of the magnetic layer 3 is located above the upper ends of the wires 2, and the lower surface of the magnetic layer 3 is located below the lower ends of the wires 2.

The magnetic layer 3 has peripheral regions 11, and an outer-side region 12 in a cross-sectional view.

The peripheral regions 11 are each a peripheral region of the wire 2, and are located around the plurality of wires 2, respectively, so as to be in contact with the plurality of wires 2. The peripheral region 11 has a generally circular ring shape in a cross-sectional view sharing a central axis with the wire 2. More specifically, the peripheral region 11 is a region, of the magnetic layer 3, from the outer peripheral surface of the wire 2 to a radially outward distance of 1.5 times (preferably 1.2 times, more preferably 1 time, further more preferably 0.8 times, particularly preferably 0.5 times) the radius of the wire 2 (average of a distance from the center (center of gravity) C1 of the wire 2 to the outer peripheral surface: R1+R2).

The peripheral region 11 is disposed around each of the plurality of wires 2, that is, around the first wire 4 and the second wire 5.

Each of the peripheral regions 11 includes a plurality of (two) orientated regions 13, and a plurality of (two) non-orientated regions 14.

The plurality of orientated regions 13 are orientated regions in the circumferential direction. That is, in the orientated region 13, the particles 8 are orientated along the circumferential direction of (around) the wire 2 (the first wire 4 or the second wire 5).

The plurality of orientated regions 13 are oppositely disposed to each other across the center C1 of the wire 2 at the upper side (one side in the third direction) and the lower side (the other side in the third direction) of the wire 2. That is, the plurality of orientated regions 13 include an upper-side orientated region 15 disposed on the upper side of the wire 2, and a lower-side orientated region 16 disposed on the low er side of the wire 2. Further, the center C1 of the wire 2 is located at the center in the up-down direction between the upper-side orientated region 15 and the lower-side orientated region 16.

In each of the orientated regions 13, a direction of high relative magnetic permeability of the particles 8 (for example, in the flat-shaped anisotropic magnetic particles, the plane direction of the particles) generally coincides with a tangent of a circle with the center C1 of the wire 2 as a center. More specifically, a case w here an angle formed by the plane direction of the particles 8, and the tangent of the circle at which the particles 8 are located is 15° or less is defined that the particles 8 are orientated in the circumferential direction.

A ratio of the number of the particles 8 orientated in the circumferential direction is, for example, above 50%, preferably 70% or more, more preferably 80% or more with respect to the number of the entire particles 8 included in the orientated region 13. That is, the orientated region 13 may include the particles 8 which are not orientated in the circumferential direction by, for example, below 50%, preferably 30% or less, more preferably 20% or less.

A ratio of the total area of the plurality of orientated regions 13 is, for example, 40% or more, preferably 50% or more, more preferably 60% or more, and for example, 90% or less, preferably 80% or less with respect to the entire peripheral region 11.

The relative magnetic permeability in the circumferential direction of the orientated region 13 is, for example, 5 or more, preferably 10 or more, more preferably 30 or more, and for example, 500 or less. The relative magnetic permeability of the radial direction is, for example, 1 or more, preferably 5 or more, and for example, 100 or less, preferably 50 or less, more preferably 25 or less. Further, a ratio (circumferential direction/radial direction) of the relative magnetic permeability of the circumferential direction to that of the radial direction is, for example, 2 or more, preferably 5 or more, and for example, 50 or less. When the relative magnetic permeability is within the above-described range, the inductance is excellent.

The relative magnetic permeability can be measured, for example, with an impedance analyzer (manufactured by Agilent Technologies Japan, Ltd., "4291B") using a magnetic material test fixture.

The plurality of non-orientated regions 14 are non-orientated regions in the circumferential direction. That is, in the non-orientated region 14, the particles 8 are not orientated along the circumferential direction of the wire 2. In other words, in the non-orientated region 14, the particles 8 are orientated along a direction other than the circumferential direction of the wire 2 (for example, the radial direction) or not orientated.

The plurality of non-orientated regions 14 are oppositely disposed to each other across the wire 2 at one side and the other side in the first direction of the wire 2. That is, the plurality of non-orientated regions 14 have a one-side non-orientated region 17 disposed on one side in the first direction of the wire 2 (the first wire 4 or the second wire 5), and an other-side non-orientated region 18 disposed on the other side in the first direction of the wire 2. The one-side non-orientated region 17 and the other-side non-orientated region 18 are generally linearly symmetrical with a straight line passing through the center C1 in the up-down direction as a reference.

In each of the non-orientated regions 14. a direction of high relative magnetic permeability of the particles 8 (for example, in the flat-shaped anisotropic magnetic particles, the plane direction of the particles) does not coincide with a tangent of a circle with the center C1 of the wire 2 as a center. More specifically, a case where an angle formed by the plane direction of the particles 8, and the tangent of the circle at which the particles 8 are located is above 15° is defined that the particles 8 are not orientated in the circumferential direction.

A ratio of the number of the particles 8 which are not orientated in lire circumferential direction is, for example, above 50%, preferably 70% or more, and for example, 95% or less, preferably 90% or less with respect to the number of the entire particles 8 included in the non-orientated region 14.

The non-orientated region 14 may include, for example, the particles 8 orientated in the circumferential direction. A ratio of the number of the particles 8 orientated in the circumferential direction is below 50%, preferably 30% or less, and for example, 5% or more, preferably 10% or more with respect to the number of the entire particles 8 included in the non-orientated region 14.

When the particles 8 orientated in the circumferential direction are included, preferably, the particles 8 orientated in the circumferential direction thereof are disposed at the innermost side of the non-orientated region 14, that is, on the surface of the wire 2.

A ratio of the total area of the plurality of non-orientated regions 14 is, for example, 10% or more, preferably 20% or more, and for example, 60% or less, preferably 50% or less, more preferably 40% or less with respect to the entire peripheral region 11.

In the peripheral region 11 (in particular, each of the orientated region 13 and the non-orientated region 14), a filling rate of the particles 8 is, for example, 40% by volume or more, preferably 45% by volume or more, and for example, 90% by volume or less, preferably 70% by volume or less. When the filling rate is the above-described lower limit or more, the inductance is excellent.

The filling rate can be calculated by measurement of the actual specific gravity, binarization of a cross-sectional view of an SEM image, and the like.

In the peripheral region 11, the plurality of orientated regions 13 and the plurality of non-orientated regions 14 are disposed so as to be adjacent to each other in the circumferential direction. Specifically, the upper-side orientated region 15, the one-side non-orientated region 17, the lower-side orientated region 16, and the other-side non-orientated region 18 are continuous in this order in the circumferential direction. The boundary (one end edge or the other end edge) between the orientated region 13 and the non-orientated region 14 in the circumferential direction is defined as a phantom line extending from the center of the wire 2 outwardly in the radial direction.

The outer-side region 12 is a region other than the peripheral region 11 of the magnetic layer 3. The outer-side region 12 is disposed so as to be continuous with the peripheral region 11 outside the peripheral region 11.

In the outer-side region 12, the particles 8 are orientated along the plane direction (particularly, the first direction).

In the outer-side region 12, the direction of high relative magnetic permeability of the particles 8 (for example, in the flat-shaped anisotropic magnetic particles, the plane direction of the particles) generally coincides with the first direction. More specifically, a case where an angle formed by the plane direction of the particles 8, and the first direction is 15° or less is defined that the particles 8 are orientated in the first direction.

In the outer-side region 12, a ratio of the number of the particles 8 orientated in the first direction is above 50%, preferably 70% or more, more preferably 90% or more with respect to the number of the entire particles 8 included in the outer-side region 12. That is, the outer-side region 12 may include the particles 8 which are not orientated in the first direction by below 50%, preferably 30% or less, more preferably 10% or less.

In the outer-side region 12, the relative magnetic permeability of the first direction is, for example, 5 or more, preferably 10 or more, more preferably 30 or more, and for example, 500 or less. The relative magnetic permeability of the up-down direction is, for example, 1 or more, preferably 5 or more, and for example, 100 or less, preferably 50 or less, more preferably 25 or less. Further, a ratio (first direction/up-down direction) of the relative magnetic permeability of the first direction to that of the up-down direction is, for example, 2 or more, preferably 5 or more, and for example, 50 or less. When the relative magnetic permeability is within the above-described range, the inductance is excellent.

In the outer-side region 12, the filling rate of the particles 8 is, for example, 40% by volume or more, preferably 45% by volume or more, and for example, 90% by volume or less, preferably 70% by volume or less. When the tilling rate is the above-described lower limit or more, the inductance is excellent.

The upper surface of the magnetic layer 3 forms the upper surface of the inductor 1. That is, the upper surface of the inductor 1 consists of the magnetic layer 3.

The upper surface of the magnetic layer 3, that is, the upper surface of the inductor 1 is flat. Specifically, on the upper surface of the magnetic laser 3, a vertical distance H1 between the uppermost end A1 in a wire region A and a midpoint M1 between the wires 2 is 30 μm or less, preferably 20 μm or less, more preferably below 5 μm.

The lower surface of the magnetic layer 3 forms the lower surface of the inductor 1. That is, the lower surface of the inductor 1 consists of the magnetic layer 3.

The lower surface of the magnetic layer 3, that is, the lower surface of the inductor 1 is flat. Specifically, on the lower surface of the magnetic layer 3, a vertical distance H2 between the lowermost end A2 in the wire region A and a midpoint M2 between the wires 2 is 30 μm or less, preferably 20 μm or less, more preferably below 5 μm.

The wire region A is a region overlapped with the wire 2 (the first wire 4 or the second wire 5) when projected in the thickness direction. Each of the midpoint M1 and the midpoint M2 is located at the center in the first direction on a straight line connecting the centers (centers of gravity) C1 of the two wires 2 adjacent to each other.

Figure 2:
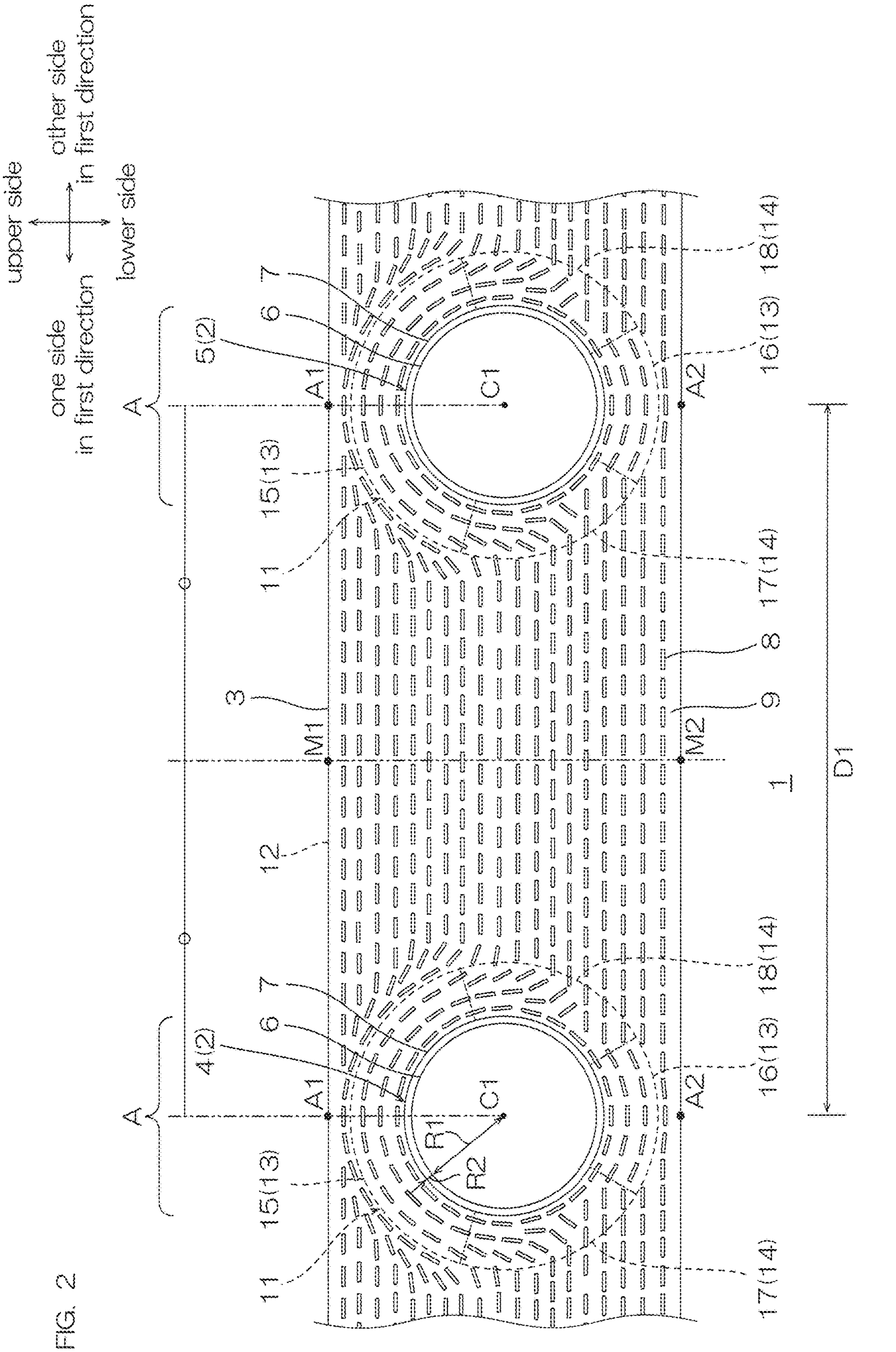
FIG. 2 shows a partially enlarged view of a dashed portion of FIG. 1B.
Figure 3:
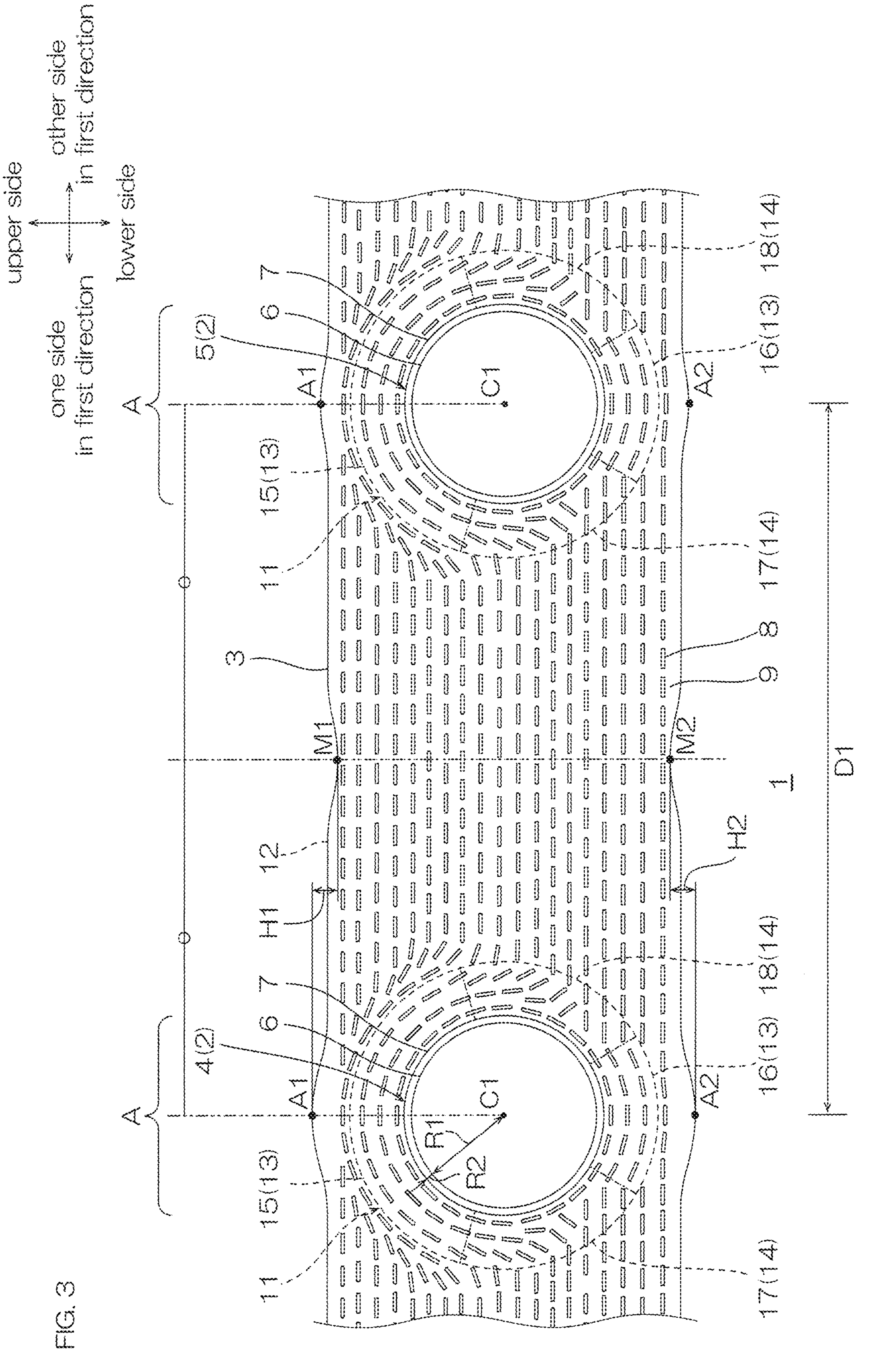
FIG. 3 shows a modified example (embodiment for facilitating understanding of the flatness of the upper surface of the inductor) of FIG. 2.

In FIG. 2, a case where each of the vertical distance H1 and H2 is 0 μm (case of completely flat) is shown. For clarity of vertical distance, for reference, a case where each of the vertical distance H1 and H2 is 1 μm or more and 30 μm or less is shown in FIG. 3.

A first directional length $T_1$ of the magnetic layer 3 is, for example, 5 mm or more, preferably 10 mm or more, and for example, 5000 mm or less, preferably 2000 mm or less.

A second directional length $T_2$ of the magnetic layer 3 is, for example, 5 mm or more, preferably 10 mm or more, and for example, 5000 mm or less, preferably 2000 mm or less.

A vertical length (in particular, a thickness at the midpoint M1) $T_3$ of the magnetic layer 3 is, for example, 100 μm or more, preferably 200 μm or more, and for example, 2000μm or less, preferably 1000 μm or less.

2. Producing Method of Inductor

One embodiment of a method for producing the inductor 1 is described with reference to FIGS. 4 A to 4B. The method for producing the inductor 1 includes, for example, a preparation step, a disposing step, and a lamination step in order.

In the preparation step, the plurality of wires 2. and two anisotropic magnetic sheets 20 are prepared.

Each of the two anisotropic magnetic sheets 20 has a sheet shape extending in the plane direction, and is formed from a magnetic composition. In the anisotropic magnetic sheet 20. the particles 8 are orientated in the plane direction. Preferably, the two anisotropic magnetic sheets 20 in a semi-cured stale (B-stage) are used.

Examples of the anisotropic magnetic sheet 20 include soft magnetic thermosetting adhesive films and soft magnetic films described in Japanese Unexamined Patent Publications Nos. 2014-165363 and 2015-92544.

Figure 4A:
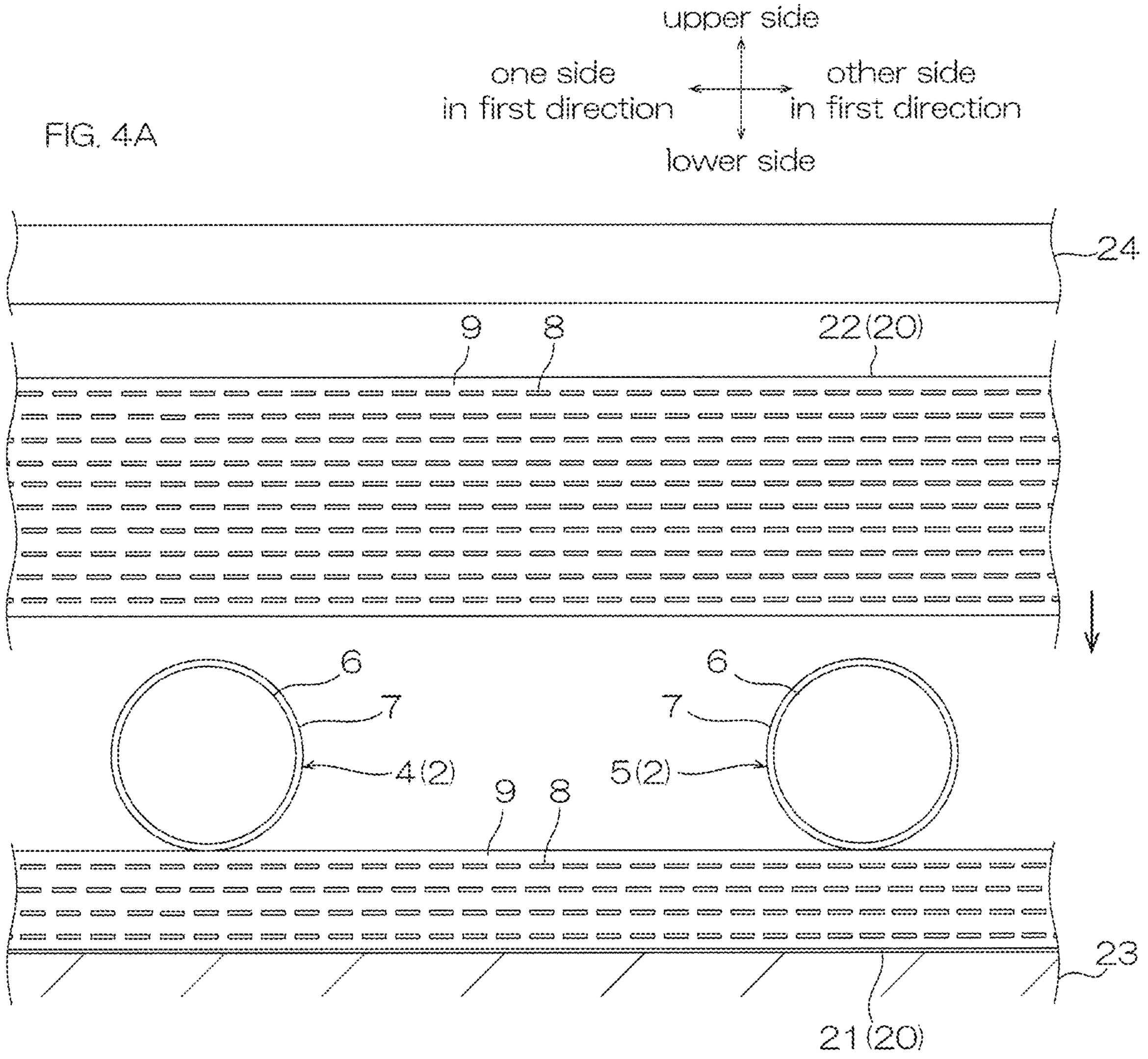
FIGS. 4A to 4B show production process views of the inductor shown in FIGS. 1A to 1B.

In the disposing step, as shown in FIG. 4A. while the plurality of wires 2 are disposed on the upper surface of one anisotropic magnetic sheet 20, the other anisotropic magnetic sheet 20 is oppositely disposed above the plurality of wires 2.

Specifically, a lower-side anisotropic magnetic sheet 21 is disposed on a horizontal table 23 whose upper surface is flat, and subsequently, the plurality of wires 2 are disposed on the upper surface of the lower-side anisotropic magnetic sheet 21 at desired spaced intervals in the first direction.

Then, an upper-side anisotropic magnetic sheet 22 is arranged above and spaced apart from the lower-side anisotropic magnetic sheet 21 and the plurality of wires 2 while facing to them.

Figure 4B:
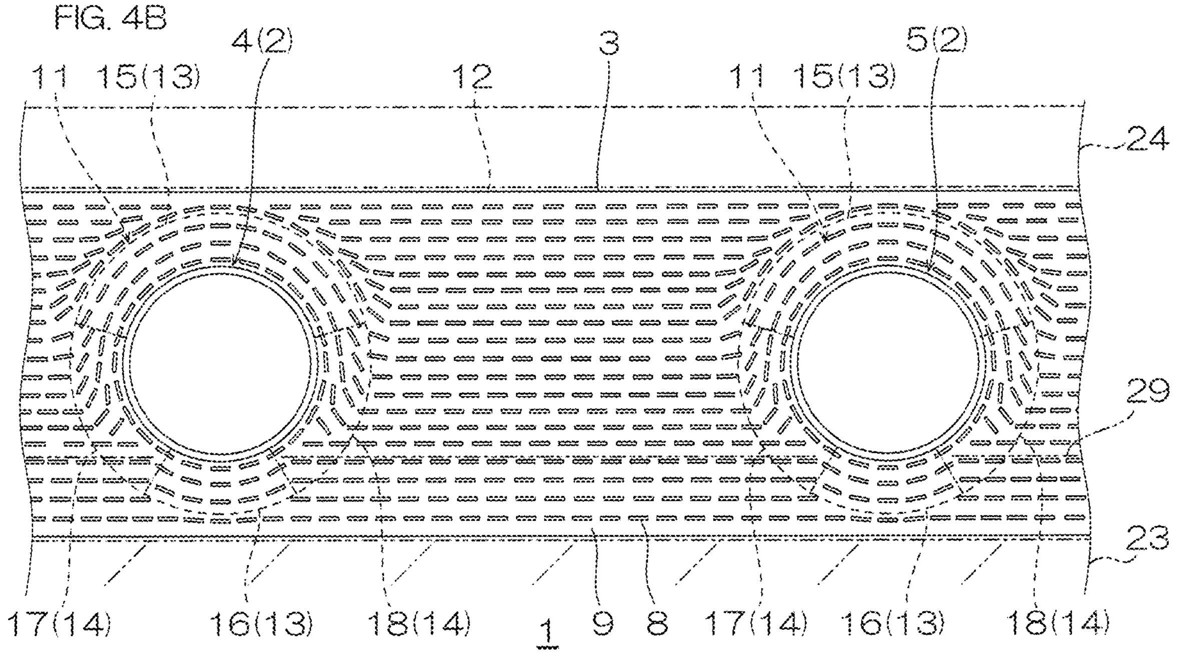

In the lamination step, as shown in FIG. 4B. the two anisotropic magnetic sheets 20 are laminated so as to embed the plurality of wires 2.

Specifically, the upper-side anisotropic magnetic sheet 22 is pressed downwardly by using a rigid or flexible pressing member 24 whose lower surface is flat. That is, the lower surface of the pressing member 24 is brought into contact with the upper surface of the upper-side anisotropic magnetic sheet 22, and the pressing member 24 is pressed toward the lower-side anisotropic magnetic sheet 21.

By being sandwiched by the two flat members (the horizontal table 23 and the pressing member 24). the upper and lower surfaces of the resulting inductor 1 are formed so as to be flat.

At this time, when the two anisotropic magnetic sheets 20 are in a semi-cured state, the plurality of wires 2 are slightly sunk into the lower-side anisotropic magnetic sheet 21 by pressing, and the particles 8 are orientated along the plurality of wires 2 in a sunk portion. That is, a lower-side orientated region 16 is formed.

Further, the upper-side anisotropic magnetic sheet 22 is covered along the plurality of wires 2 with the particles 8 therein orientated along the plurality of wires 2, and is laminated on the upper surface of the lower-side anisotropic magnetic sheet 21. That is, at the upper side of the wire 2, an upper-side orientated region 15 is formed by the upper-side anisotropic magnetic sheet 22, and at both sides (sideways) in the first direction of the wire 2, the particles 8 which are orientated in the lower-side anisotropic magnetic sheet 21 and the upper-side anisotropic magnetic sheet 22 collide near their contact point. As a result, a non-orientated region 14 is formed.

When the anisotropic magnetic sheet 20 is in a semi-cured state, it is heated. Thus, the anisotropic magnetic sheet 20 is brought into a cured state (C-stage). Further, a contact interface 29 of the two anisotropic magnetic sheets 20 disappears, and the two anisotropic magnetic sheets 20 form one magnetic layer 3.

Figure 5:
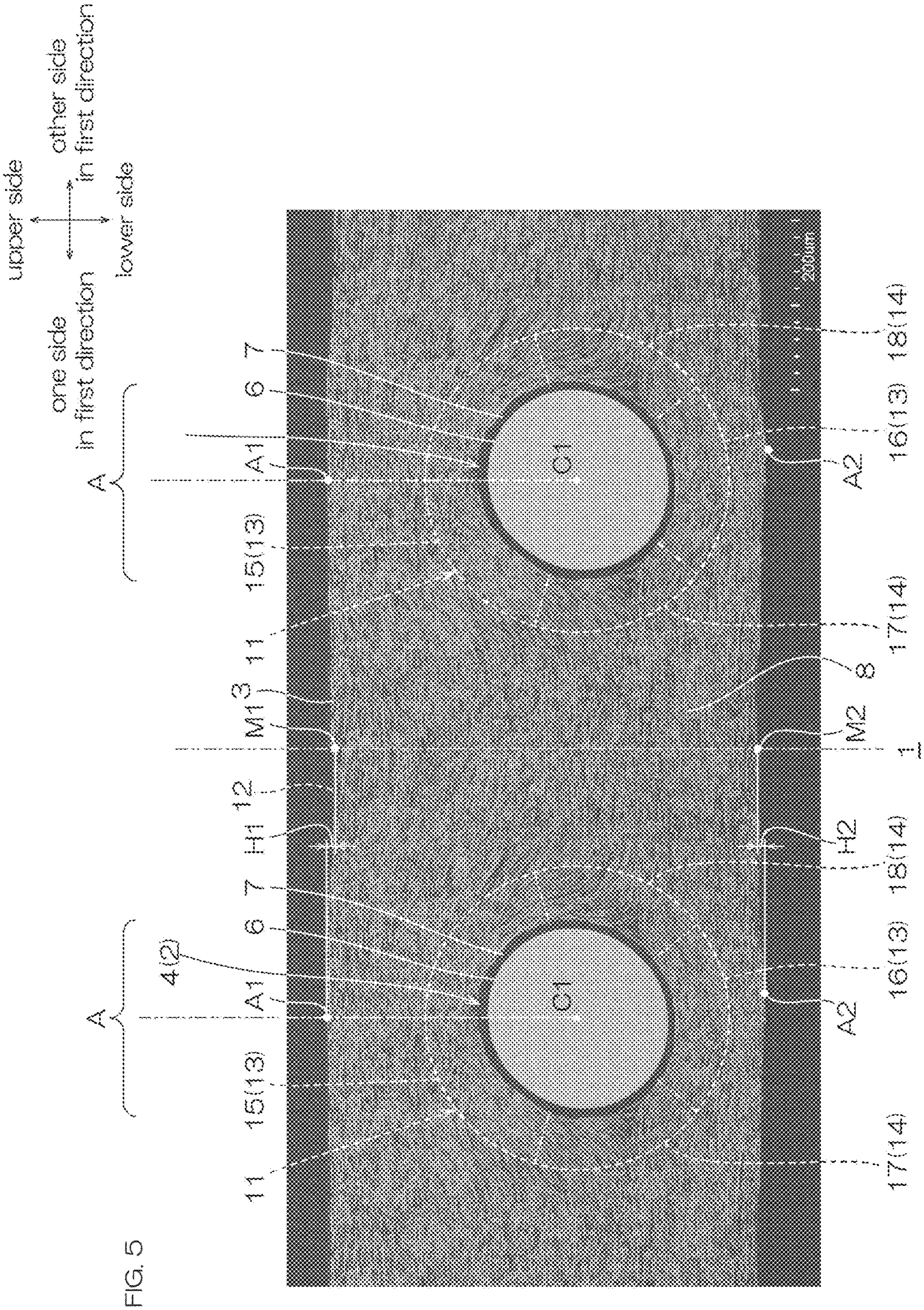
FIG. 5 shows a cross-sectional view of an actual SEM image of the inductor shown in FIGS 1A to 1B.

Thus, as shown in FIG. 2. the inductor 1 including the wire 2 in a generally circular shape in a cross-sectional view, and the magnetic layer 3 covering it is obtained. That is, the inductor 1 is obtained by laminating the plurality of (two) anisotropic magnetic sheets 20 so as to sandwich the wires 2 therebetween. A cross-sectional view (SEM image) of one example of the actual inductor 1 is shown in FIG. 5.

3. Usage

The inductor 1 is one component of an electronic device, that is, a component for fabricating an electronic device, and is an industrially available device whose component alone is circulated without including tin electronic element (chip, capacitor, and the like) and a wiring board for mounting the electronic element thereon.

Figure 6A:
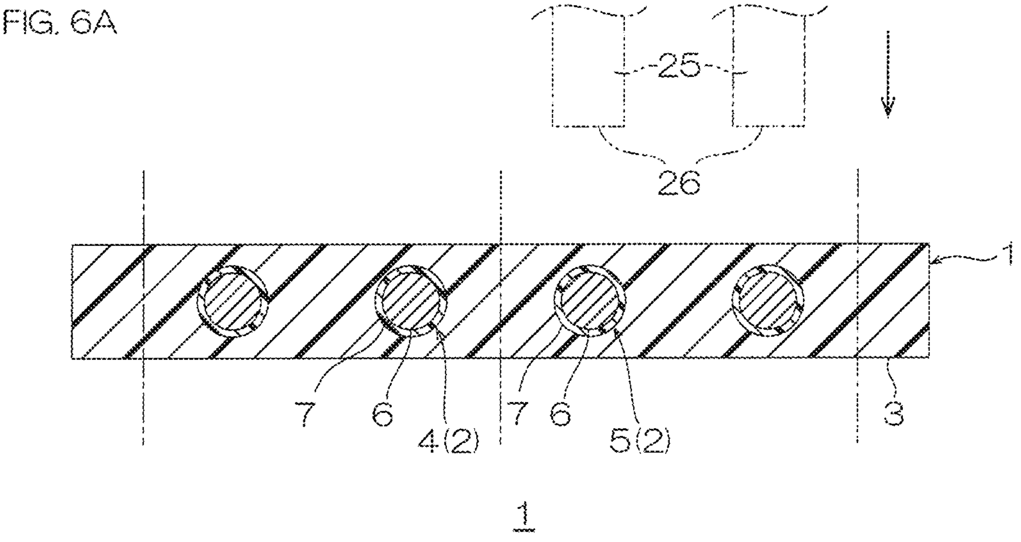
FIGS. 6A to 6C show process views showing mounting of an inductor.
Figure 6B:
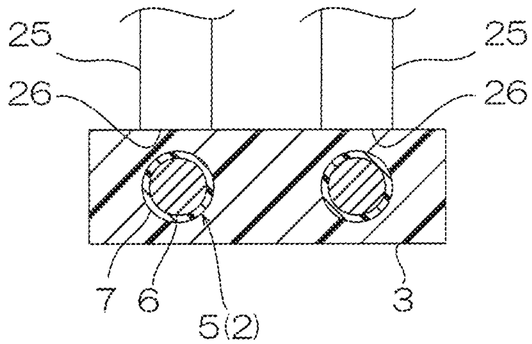
Figure 6C:
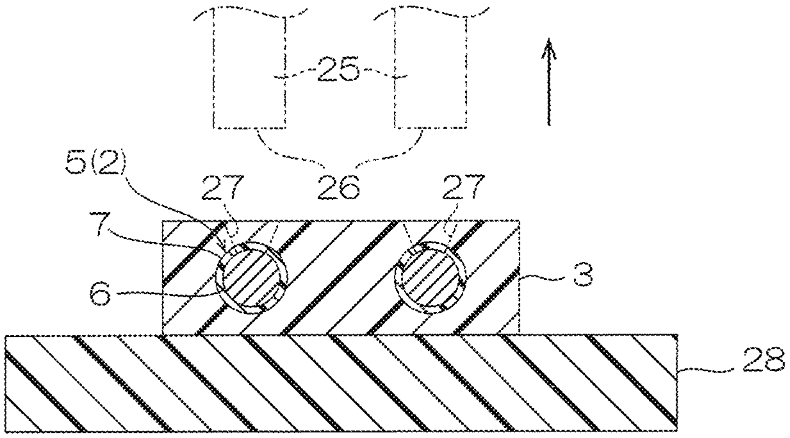

The inductor 1 is, for example, loaded (mounted) on an electronic device and the like. Specifically, as shown in FIGS. 6A to 6C, the mounting of the inductor 1 includes, for example, a singulation step, a conveyance step, a disposing step, and a connecting step in order.

In the singulation step, as shown by broken lines of FIG. 6 A, the inductor 1 is cut to be singulated.

That is, the magnetic layer 3 of the inductor 1 is completely cut in the thickness direction so that the inductor 1 includes one wire 2 (the first wire 4 or the second wire 5).

Examples of a method of cutting the inductor 1 include a method using a disk-shaped dicing saw, a method using a cutter, and a method using, a laser.

In the conveyance step, the singulated inductor 1 is conveyed. That is, the inductor 1 is moved above a wiring board 28 by using a suction conveyance device such as a collet 25.

Specifically, as shown by phantom lines of FIG. 6A, the plurality of (two) collets 25 are moved above the inductor 1. At this time, each of the collets 25 is moved so that a front end surface 26 of each collet 25 is located above the wire 2 (ref: an arrow of FIG. 6A).

Subsequently, as shown in FIG. 6B, the collet 25 is moved downwardly, and the front end surface 26 of the collet 25 is brought into contact with the upper surface of the inductor 1. Subsequently, by being sucked front the front end surface 26 of the collet 25, the from end surface 26 of the collet 25 is brought into tight contact with the upper surface of the inductor 1.

At this time, since the upper surface of the inductor 1 is fiat, a gap is less likely to occur between the front end surface 26 of the collet 25 and the inductor 1. Therefore, the collet 25 is firmly fixed to the inductor 1.

Subsequently, the collet 25 is moved upwardly, while the inductor 1 is in tight contact therewith. That is, the inductor 1 is lifted. Thereafter, the collect 25 is moved to above the desired wiring board 28.

In the disposing step, the inductor 1 is disposed on the upper surface of the wiring board 28.

Specifically, the collet 25 is moved downwardly so that the lower surface of the inductor 1 is in contact with the upper surface of the wiring board 28. Subsequently, the suction of the collet 25 is ceased, and the collet 25 is separated from the inductor 1 (ref the arrow of FIG. 6C).

Thus, as shown in FIG. 6C, the inductor 1 is disposed on the upper surface of the wiring board 28.

In the connecting step, the inductor 1 is electrically connected to the wiring board 28. That is, the inductor 1 and the wiring board 28 are electrically connected directly or through another electronic element (semiconductor chip, capacitor, and the like).

Specifically, for example, a via 27 to the conducting line 6 is formed in the inductor 1 (ref: the phantom lines of FIG. 6C). Subsequently, the conducting line 6 and the wiring board 28 or the electronic element and the like are electrically connected through the via 27 by wire bonding mounting, flip-chip mounting, soldering, and the like.

The inductor 1, for example, acts as a passive element such as a coil.

Then, in the periphery of the wire 2. the inductor 1 has the orientated region 13 (orientated region in the circumferential direction) in which the particles 8 are orientated along the periphery of the wire 2. Therefore, an easy axis of magnetization of the particles 8 is the same as a direction of a line of magnetic force generated around the wire. Therefore, the inductance is excellent.

Then, in the periphery of the wire 2, the inductor 1 has the non-orientated region 14 (non-orientated region in the circumferential direction) in which the particles 8 are not orientated along the circumferential direction of the wire 2. Therefore, a hard axis of magnetization of the particles 8 is the same as the direction of the line of magnetic force generated around the wire. Therefore, the DC superposition characteristics are excellent.

Further, since the upper surface of the inductor 1 is flat, the upper surface thereof is sucked by a conveyance device such as the collet 23, and the inductor 1 can be reliably fixed to the collet 25. Therefore, it is possible to suppress falling from the collet 25 during conveyance, and reliably convey the inductor 1. Further, since the lower surface of the inductor 1 is flat, it can be disposed on the upper surface of the wiring board 28 without tilting. Therefore, it has excellent mountability.

Further, the plurality of wires 2 are disposed spaced apart from each other in the first direction, and continuous through the magnetic layer 3. Therefore, the magnetic layer 3 is disposed between the plurality of wires 2. As a result, a presence amount of the magnetic layer 3 is increased, and the inductance is further more excellent.

Further, the magnetic lay er 3 is continuous from lire upper surface to the lower surface of the inductor 1, and both the upper surface and the lower surface of the inductor 1 consist of the magnetic layer 3. According to the inductor 1, the inductor 1 is filled with the magnetic layer 3 except for the region where the wire 2 is present. Therefore, the inductance is significantly excellent.

4. Modified Examples

Figure 7:
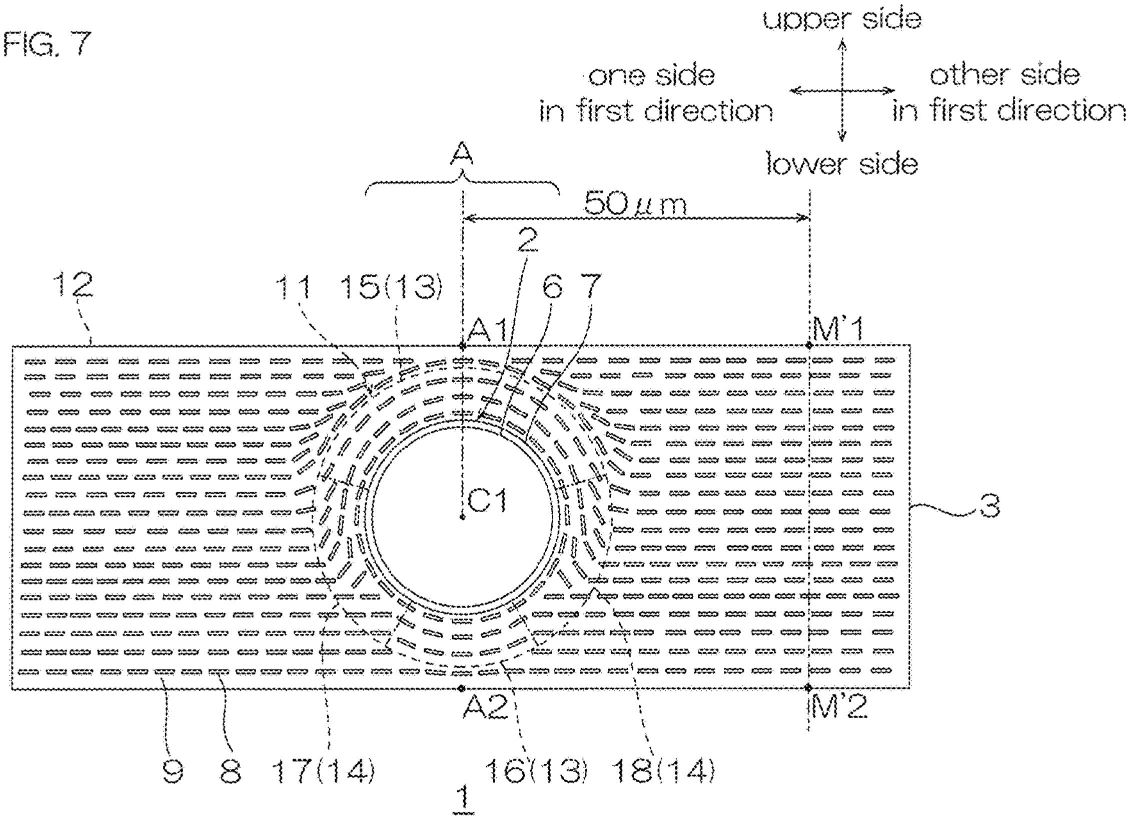
FIG. 7 shows a modified example (embodiment of a single wire) of the inductor shown in FIGS. 1A to 1B.

Modified examples of one embodiment shown in FIGS. 1A to 2 are described with reference to FIG. 7. In the modified examples, the same reference numerals are provided for members corresponding to each of those in the above-described one embodiment, and their detailed description is omitted.

In the embodiment shown in FIG. 1B, the wire 2 has a generally U-shape when viewed from the top. However, the shape thereof is not limited, and can be appropriately set.

Further, m the embodiment shown in FIGS. 1A to 1B, the two wires 2 are provided However, the number thereof is not limited, and it may be also one, or three or more.

For example. FIG. 7 shows the inductor 1 including a single wire 2. The upper surface of the inductor 1 shown in FIG. 7 is flat. Specifically, a distance in the up-down direction between the uppermost end A1 in the wire region A and a point M'1 which is 50 μm away from the uppermost end A1 in the plane direction is 30 μm or less (preferably, 20 μm or less, more preferably, below 5 μm). That is, the point M'1 which is 50 μm away from the uppermost end A1 in the plane direction is referred to as a reference of flatness instead of the midpoint M1.

The lower surface of the magnetic layer 3 is also flat, and the reference of the flatness is also the same as the reference of the flatness of the upper surface of the magnetic layer 3. That is, a point M'2 which is 50 μm away in the plane direction is referred to as a reference instead of the midpoint M2.

Further, in the embodiment shown in FIGS. 1A to 1B, the shape in a cross-sectional view of the wire 2 is generally circular, and the shape thereof is not limited. Examples of the shape thereof include a generally elliptical shape, a generally rectangular (including square and rectangular) shape, and a generally indefinite shape. As an embodiment in which the wire 2 includes a generally rectangular shape at least one side may be curved, and also at least one corner may be curved.

In any of the description above, the peripheral region 11 is, in a cross-sectional view, a region from the outer peripheral surface of the wire 2 to an outward distance of 1.5 times an average ([longest length+shortest length]/2) of the longest length and the shortest length from the center of gravity C1 of the wire 2 to the outer peripheral surface of the wire 2.

Further, in the embodiment shown in FIGS. 1A to 1B, a ratio of the anisotropic magnetic particles 8 in the magnetic layer 3 may be uniform in the magnetic layer 3, and also may be higher or lower as they are away from each of the wires 2.

Second to Fifth Embodiments

Second to fifth embodiments of the inductor of the present invention are described with reference to FIGS. 8 to 11. In the embodiments, the same reference numerals are provided for members corresponding to each of those in the above-described first embodiment, and their detailed description is omitted. Also, these embodiments can achieve the same function and effect as that of the first embodiment. Further-more, the modified examples of the first embodiment can be also applied to these embodiments in the same manner.

(1) Second Embodiment

In the first embodiment, both the upper surface and the lower surface of the inductor 1 consist of the magnetic layer 3. Alternatively, for example, in the second embodiment, at least one of the upper surface and the lower surface of the inductor 1 may also consist of the magnetic layer 3. For example, in one embodiment of the second embodiment, as shown in FIG. 8. only the lower surface of the inductor 1 consists of the magnetic layer 3.

Figure 8:
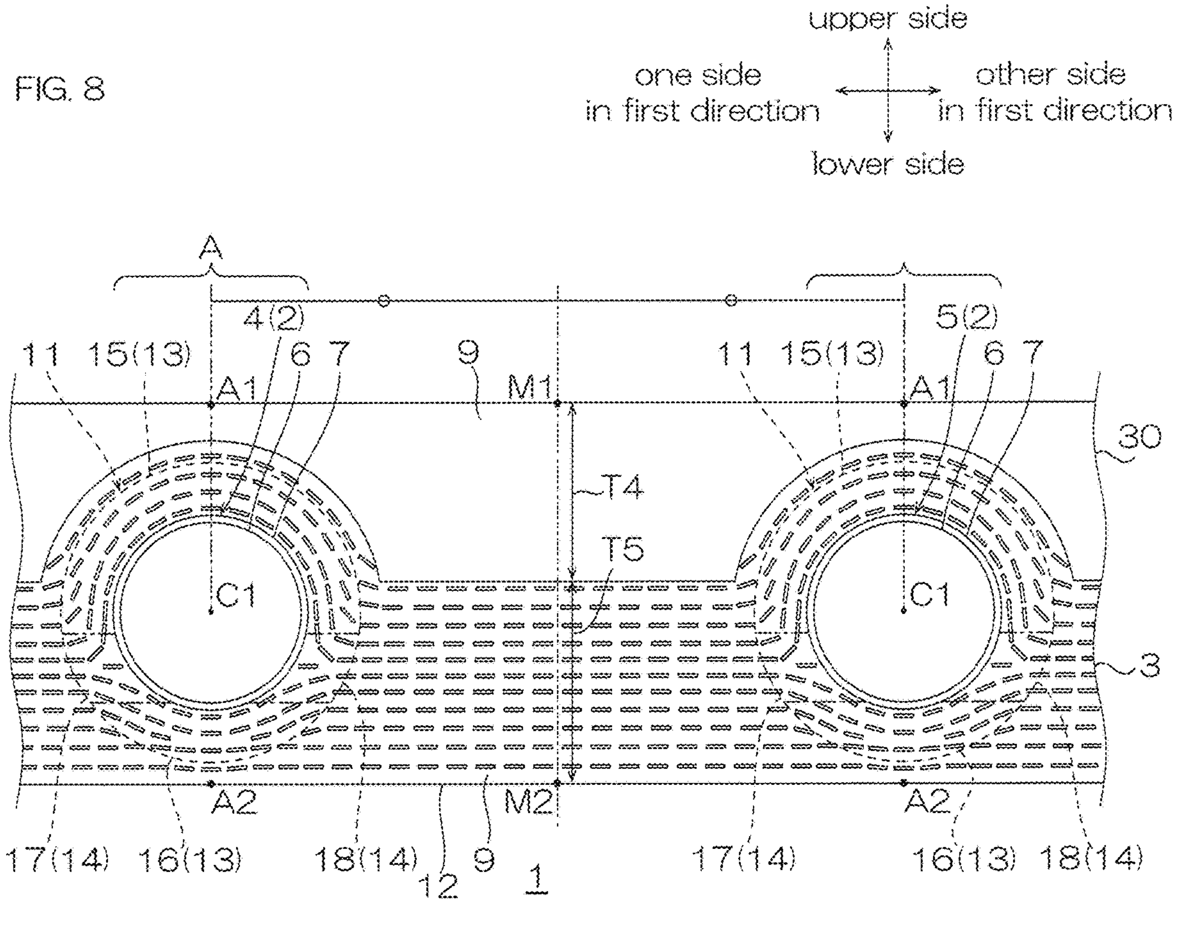
FIG. 8 shows a partially enlarged cross-sectional view of a second embodiment of an inductor of the present invention.

In the embodiment shown in FIG. 8. the upper surface of the inductor 1 is formed of a non-magnetic resin layer 30 containing no particle 8. Specifically, the inductor 1 includes the plurality of (two) wires 2, the magnetic layer 3, and the non-magnetic resin layer 30.

The non-magnetic resin layer 30 is disposed on the upper surface of the magnetic layer 3 so as to be in contact with the entire upper surface thereof. The upper surface of the non-magnetic resin layer 30 is fiat and the lower surface of the non-magnetic resin layer 30 is non-flat.

The non-magnetic resin layer 30 is formed from a resin composition containing a binder. An example of the binder includes the binder 9 illustrated in the magnetic composition. Further, if necessary, the resin composition may also contain additives such as a thermosetting catalyst, inorganic particles, organic particles, and a cross-linking agent.

A thickness T4 at the midpoint M1 of the non-magnetic resin layer 30 is, for example, 0.01 times or more, preferably 0.05 times or more, and for example, 10 times or less, preferably 5 times or less a thickness T5 at the midpoint M1 of the magnetic laser 3. Specifically, the thickness T4 at the midpoint M of the non-magnetic resin layer 30 is, for example, 5 μm or more, preferably 10 μm or more, and for example, 500 μm or less, preferably 200 μm or less.

Preferably, from the viewpoint of a wide range of the magnetic layer 3 in the inductor 1 and more excellent inductance, the first embodiment ts used.

(2) Third Embodiment

In the first embodiment, both the upper surface and the lower surface of the inductor consist of the magnetic layer 3. Alternatively, for example, in the third embodiment, as shown in FIG. 9, the upper surface and the lower surface of the inductor 1 may consist of the non-magnetic resin layer 30.

Figure 9:
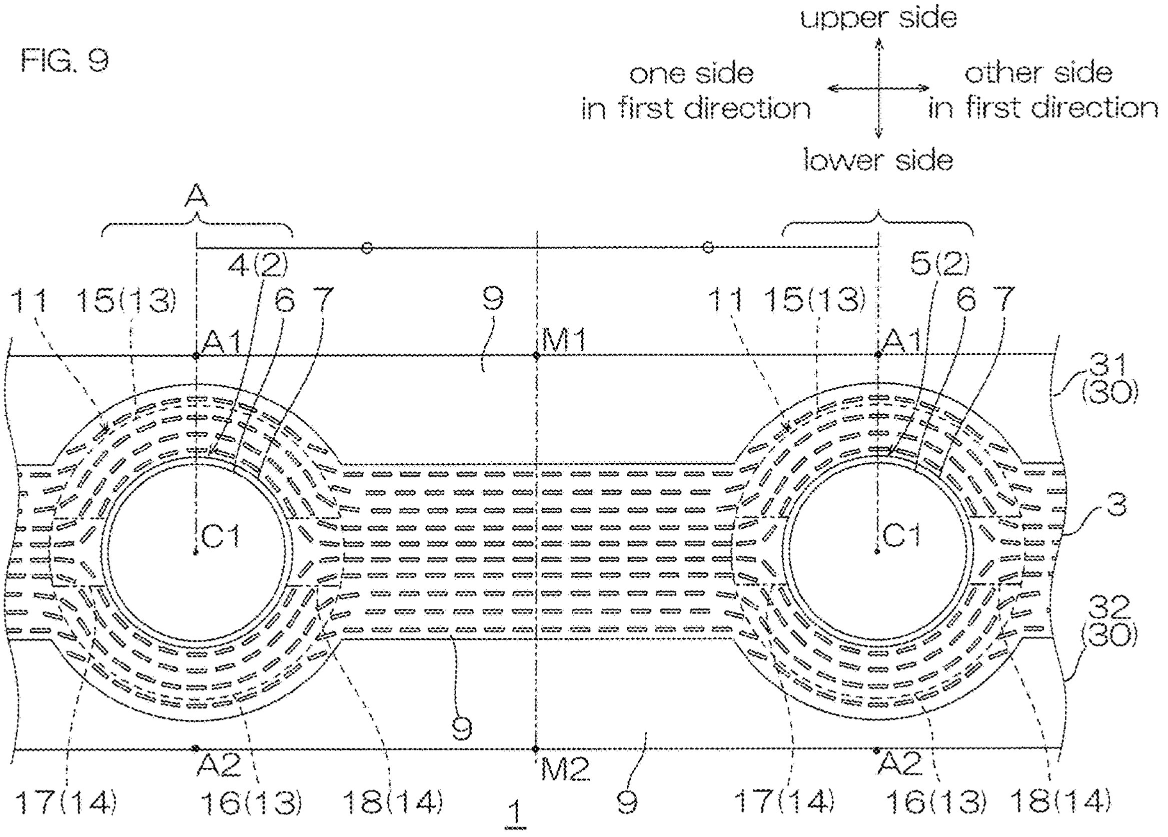
FIG. 9 shows a partially enlarged cross-sectional view of a third embodiment of an inductor of the present invention.

In the embodiment shown in FIG. 9. the upper surface and the lower surface of the inductor 1 are formed of the nonmagnetic resin layer 30 containing no particles 8. Specifically, the inductor 1 includes the plurality of (two) wires 2. the magnetic layer 3, a first non-magnetic resin layer 31, and a second non-magnetic resin layer 32.

The first non-magnetic resin layer 31 is disposed on the upper surface of the magnetic layer 3 so as to be in contact with the entire upper surface of the magnetic layer 3. The upper surface of the first non-magnetic resin layer 31 is flat, and the lower surface of the first non-magnetic resin layer 31 is non-flat.

The second non-magnetic resin laser 32 is disposed on the lower surface of the magnetic layer 3 so as to be m contact with the entire lower surface thereof. The lower surface of the second non-magnetic resin layer 32 is flat, and the upper surface of the second non-magnetic resin layer 32 is non-flat.

Preferably, from the viewpoint of a wide range of the magnetic layer 3 in the inductor 1 and more excellent inductance, the first embodiment is used.

(3) Fourth to Fifth Embodiments

Figure 10:
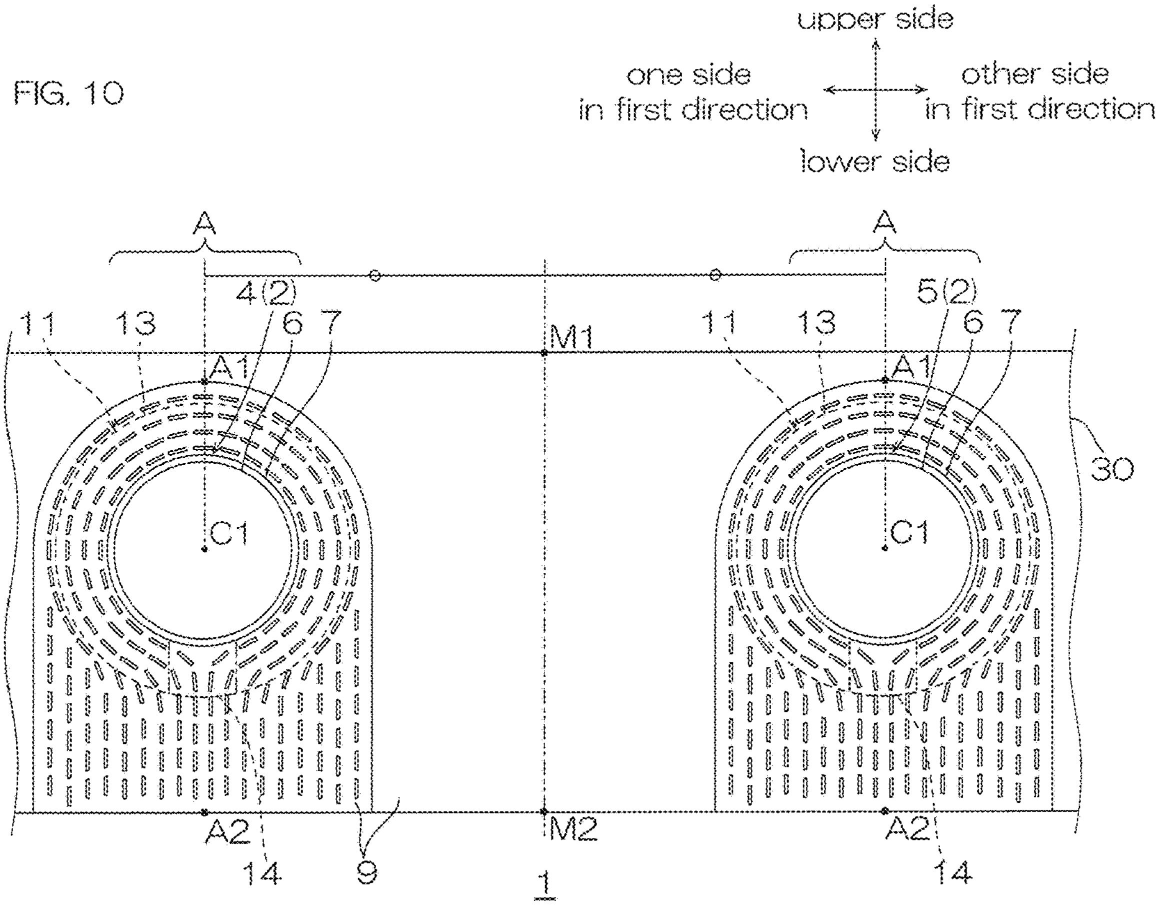
FIG. 10 shows a partially enlarged cross -sectional view of a fourth embodiment of an inductor of the present invention.
Figure 11:
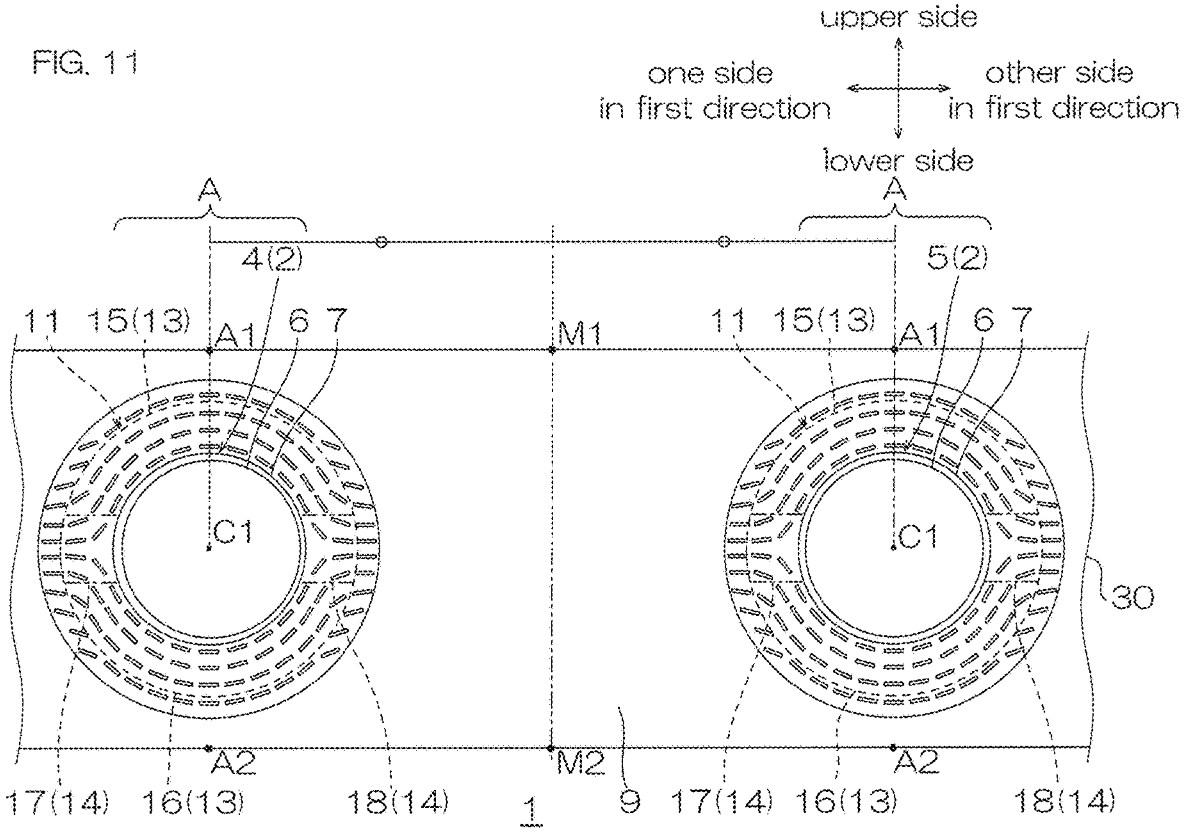
FIG. 11 shows a partially enlarged cross-sectional view of a fifth embodiment of an inductor of the present invention.
Figure 12:
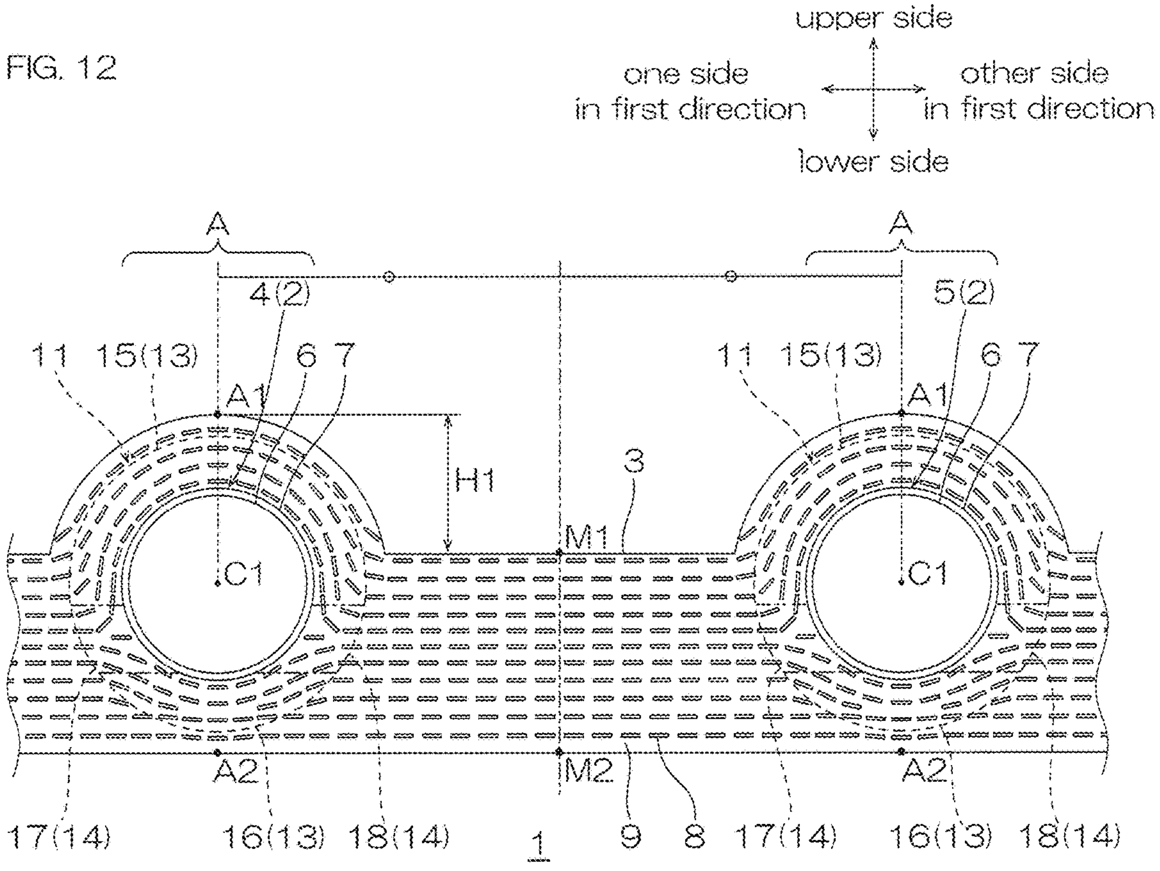
FIG. 12 shows a partially enlarged cross-sectional view of an inductor (inductor whose upper surface is not flat) as a reference of the present invention.

In the first embodiment, the plurality of wires 2 are continuous through the magnetic layer 3. Alternatively, for example, in the fourth to fifth embodiments, as shown in FIGS. 10 to 11, the plurality of wires 2 may not be continuous through the magnetic layer 3. That is, the fourth to fifth embodiments include the plurality of magnetic layers 3 which are disposed spaced apart from each other in the first direction, and each of the plurality of magnetic layers 3 is formed so as to surround the wire 2.

Specifically, in the fourth embodiment, as shown m FIG. 10, the magnetic layer 3 is formed so as to surround the periphery of the wire 2 and to be exposed from the lower surface of the inductor 1. The magnetic layer 3 forms a portion of the lower surface of the inductor 1. That is, a portion of the lower surface of the inductor 1 consists of the magnetic layer 3. Specifically, the upper surface of the inductor 1 consists of the non-magnetic resin layer 30, and the lower surface of the inductor 1 consists of the magnetic layer 3 and the non-magnetic resin layer.

In the fifth embodiment, as shown in FIG. 11, the magnetic layer 3 is formed so as to surround the periphery of the wire 2. The periphery of the magnetic layer 3 is covered with the non-magnetic resin layer 30. That is, the upper surface and the low er surface of the inductor 1 consist of the non-magnetic resin layer 30.

Of the fourth to fifth embodiments, the fourth embodiment is preferably used. Since a portion of the lower surface of the inductor 1 consists of the magnetic layer 3, a ratio of the magnetic layer 3 included in the inductor 1 is large. Therefore, the inductance is excellent.

In addition, of the first to fifth embodiments, the first to third embodiments are preferably used. In these embodiments, since the wires 2 are continuous through the magnetic layer 3, there are many magnetic layers 3 between the wires 2. Therefore, the inductance is excellent.

INDUSTRIAL APPLICABILITY

The inductor of the present invention can be, for example, used as a passive element such as a voltage conversion member.

DESCRIPTION OF REFERENCE NUMERALS

1 Inductor
2 Wire
3 Magnetic layer
6 Conducting line
7 Insulating layer
8 Anisotropic magnetic particle
13 Orientated region

The invention claimed is:

1. An inductor comprising:

a wire, and a magnetic layer covering the wire, wherein the wire includes a conducting line, and an insulating layer covering the conducting line;

a shape in a cross-sectional view of the wire is generally circular or generally elliptical;

the magnetic layer contains an anisotropic magnetic particle, and a binder;

the magnetic layer has a peripheral region and an outer-side region other than the peripheral region in a cross-sectional view;

in the peripheral region, the magnetic layer includes an orientated region in which the anisotropic magnetic particle is orientated along a periphery of the wire;

in the outer-side region, a ratio of a number of anisotropic magnetic particles orientated in a perpendicular direction perpendicular to a thickness direction of the inductor is 70% or more with respect to a number of the entire anisotropic magnetic particles included in the outer-side region;

the peripheral region is, in a cross-sectional view, a region from an outer surface of the wire to an outward distance of 1.5 times an average of a longest length and a shortest length from a center of gravity of the wire to the outer surface of the wire; and one surface in the thickness direction and an other surface in the thickness direction of the inductor are flat.

2. The inductor according to claim 1, wherein a plurality of wires are disposed spaced apart from each other in the perpendicular direction perpendicular to the thickness direction, and the plurality of wires are continuous through the magnetic layer.

3. The inductor according to claim 1, wherein at least one of one surface in the thickness direction and the other surface in the thickness direction of the inductor consists of the magnetic layer.

4. The inductor according to claim 3, wherein the magnetic layer is continuous from one surface in the thickness direction to the other surface in the thickness direction of the inductor, and both one surface in the thickness direction and the other surface in the thickness direction of the inductor consist of the magnetic layer.

* * * * *